United States Patent
Hutz et al.

(10) Patent No.: US 11,032,491 B2
(45) Date of Patent: Jun. 8, 2021

(54) PRESERVING PRIVACY IN SURVEILLANCE

(71) Applicant: Alarm.com Incorporated, Tysons, VA (US)

(72) Inventors: David James Hutz, Herndon, VA (US); Allison Beach, Leesburg, VA (US); Narayanan Ramanathan, Chantilly, VA (US); Benjamin Asher Berg, Washington, DC (US); Christopher Silverman, Alexandria, VA (US); Donald Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/007,486

(22) Filed: Aug. 31, 2020

(65) Prior Publication Data
US 2020/0404190 A1    Dec. 24, 2020

Related U.S. Application Data

(63) Continuation of application No. 16/109,263, filed on Aug. 22, 2018, now Pat. No. 10,798,313.

(Continued)

(51) Int. Cl.
*G06T 7/73* (2017.01)
*H04N 5/262* (2006.01)
(Continued)

(52) U.S. Cl.
CPC ....... *H04N 5/2621* (2013.01); *G06K 9/00375* (2013.01); *G06K 9/00771* (2013.01);
(Continued)

(58) Field of Classification Search
CPC ............. G06K 9/6274; G06K 9/00375; G06K 9/00771; G06K 9/4628; H04N 5/2621
See application file for complete search history.

(56) References Cited

U.S. PATENT DOCUMENTS

2007/0286520 A1   12/2007   Zhang et al.
2007/0296817 A1   12/2007   Ebrahimi et al.
(Continued)

FOREIGN PATENT DOCUMENTS

CN        106803943       6/2017
WO     WO2017/129804      8/2017

OTHER PUBLICATIONS

Extended European Search Report in European Application No. 18848602.1, dated Oct. 19, 2020, 7 pages.

(Continued)

*Primary Examiner* — Sam Bhattacharya
(74) *Attorney, Agent, or Firm* — Fish & Richardson P.C.

(57) ABSTRACT

Methods, systems, and apparatus, including computer programs encoded on a computer storage medium, for preserving privacy in surveillance. The methods, systems, and apparatus include actions of obtaining images of a scene captured by a camera, identifying an object in the images through object recognition, determining that the object that is identified in the images is of a particular type that has a privacy restriction, and in response to determining that the object in the images is of the particular type that has the privacy restriction, obfuscating an appearance of the object in the images.

17 Claims, 8 Drawing Sheets

Related U.S. Application Data

(60) Provisional application No. 62/548,757, filed on Aug. 22, 2017.

(51) Int. Cl.
    *G06K 9/00*     (2006.01)
    *H04N 7/18*     (2006.01)
    *G06K 9/46*     (2006.01)
    *G06K 9/62*     (2006.01)

(52) U.S. Cl.
    CPC ......... *G06K 9/4628* (2013.01); *G06K 9/6274* (2013.01); *G06T 7/73* (2017.01); *H04N 7/188* (2013.01); *G06T 2207/20084* (2013.01); *G06T 2207/30232* (2013.01)

(56) References Cited

U.S. PATENT DOCUMENTS

| | | |
|---|---|---|
| 2008/0117295 A1 | 5/2008 | Ebrahimi et al. |
| 2008/0138783 A1* | 6/2008 | Karkanias ............... G09B 7/02 434/322 |
| 2008/0181533 A1 | 7/2008 | Jung et al. |
| 2009/0201372 A1 | 8/2009 | O'Doherty et al. |
| 2014/0176663 A1* | 6/2014 | Cutler ................. G06T 5/002 348/14.07 |
| 2014/0334676 A1* | 11/2014 | Skans ............. G08B 13/19686 382/103 |
| 2015/0220777 A1 | 8/2015 | Kauffmann et al. |
| 2018/0107830 A1 | 4/2018 | Bobbitt et al. |
| 2018/0174299 A1* | 6/2018 | Agrawal ................ H04N 13/15 |

OTHER PUBLICATIONS

PCT International Preliminary Report on Patentability in International Application No. PCT/US2018/047603, dated Feb. 25, 2020, 8 pages.

PCT International Search Report and Written Opinion in International Application No. PCT/US2018/047603, dated Oct. 26, 2018, 12 pages.

\* cited by examiner

PRESERVING PRIVACY IN SURVEILLANCE

CROSS REFERENCE TO RELATED APPLICATIONS

This application is a continuation of U.S. application Ser. No. 16/109,263, filed Aug. 22, 2018, now allowed, which claims benefit of U.S. Provisional Application No. 62/548,757, filed on Aug. 22, 2017, titled "PRESERVING PRIVACY IN SURVEILLANCE," and each application is hereby incorporated by reference in its entirety.

TECHNICAL FIELD

This disclosure application relates generally to monitoring systems, and more particularly, to privacy in monitoring systems.

BACKGROUND

A monitoring system for a property can include various components including sensors, cameras, and other devices. The monitoring system can be used to perform surveillance in the property.

SUMMARY

Techniques are described for preserving privacy in surveillance.

In some aspects, the subject matter described in this specification may be embodied in methods that may include the actions of obtaining images of a scene captured by a camera, identifying an object in the images through object recognition, determining that the object that is identified in the images is of a particular type that has a privacy restriction, and in response to determining that the object in the images is of the particular type that has the privacy restriction, obfuscating an appearance of the object in the images.

In some aspects, the subject matter described in this specification may be embodied in methods that may include the actions of obtaining images of a scene captured by a camera, determining from the images whether at least a portion of a person is inside a geographical location that has been designated as a privacy region, and in response to determining from the images that at least a portion of a person is inside a geographical location that has been designated as a privacy region, obfuscating an appearance of the person in the images.

Other versions include corresponding systems, apparatus, and computer programs, configured to perform the actions of the methods, encoded on computer storage devices.

These and other versions may each optionally include one or more of the following features. For instance, in some implementations determining that the object that is identified in the images is of a particular type that has a privacy restriction includes obtaining a list of types of objects that are sensitive, determining that the object identified in the images is included in the list of types of objects that are sensitive, and in response to determining that the object identified in the images is included in the list of types of objects that are sensitive, determining that the object in the images is of a particular type that has a privacy restriction.

In some aspects, identifying an object in the images through object recognition includes determining a privacy region in the images, where identifying the object in the images is from performing object recognition in only the privacy region in the images. In certain aspects, determining that the object that is identified in the images is of a particular type that has a privacy restriction includes determining that a person is interacting with the object, where obfuscating the appearance of the object in the images is in response to determining that the person is interacting with the object.

In some implementations, determining that a person is interacting with the object includes identifying a hand in the images and determining that the hand is touching the object. In some aspects, actions include determining that a person has stopped interacting with the object and in response to determining that a person has stopped interacting with the object, stopping obfuscation of an appearance of the object in the images. In certain aspects, determining that the object in the images is of a particular type that has a privacy restriction includes determining that a state of the object has changed based on a change in the appearance of the object and where obfuscating the appearance of the object in the images is in response to determining that the state of the object has changed based on the change in the appearance of the object.

In some implementations, obfuscating an appearance of the object in the images comprises pixel-scrambling pixels that represent the object in the images. In some aspects, obfuscating an appearance of the object in the images includes using blur-kernels on pixels that represent the object in the images. In certain aspects, the object includes a keypad, a personal computer, an automated teller machine, a credit card reader, a cash register, an access control panel, a computer monitor, a tablet display, a phone display, a credit card, a driver's license, a photo identification, or a passport.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Video surveillance systems have grown tremendously in popularity and have become incorporated into various security systems of public institutions, organizations, and private homes. Recent trends in price erosion of system hardware and network bandwidth optimization has resulted in High Definition (HD) video surveillance becoming increasingly affordable and common. While the increase in resolution of video surveillance has opened tremendous opportunities in video content analysis, (e.g., person identification, vehicle identification, action recognition, object tracking, etc.), the level of detail to which such security systems can capture the interactions of an individual in a surrounding scene has resulted in a growing concern of privacy preservation.

The technology of the present disclosure describes methods and systems for preserving privacy in surveillance. The systems may be used to aid video surveillance systems to provide observation that preserves information privacy. The systems may protect private data during the detection of privacy sensitive objects at a scene, the identification of privacy sensitive actions at a scene, and the obfuscation of privacy sensitive data. For example, the systems may be used to localize objects associated with sensitive or private data. In this instance, the systems may identify privacy regions in a captured image that may include sensitive data. In another example, the systems may be used to identify instances when sensitive information is being shared or is anticipated to be shared. In this instance, the systems may identify when a user is interacting with an object to exchange sensitive information. Further, the systems may be used to alter image pixels, reversibly or irreversibly, that correspond to sensitive data in an image, over the duration of a particular event. In this instance, the systems can be configured to obfuscate sensitive data in multiple images corresponding to the particular event, so that the privacy of sensitive data may be protected during surveillance.

Figure 1:
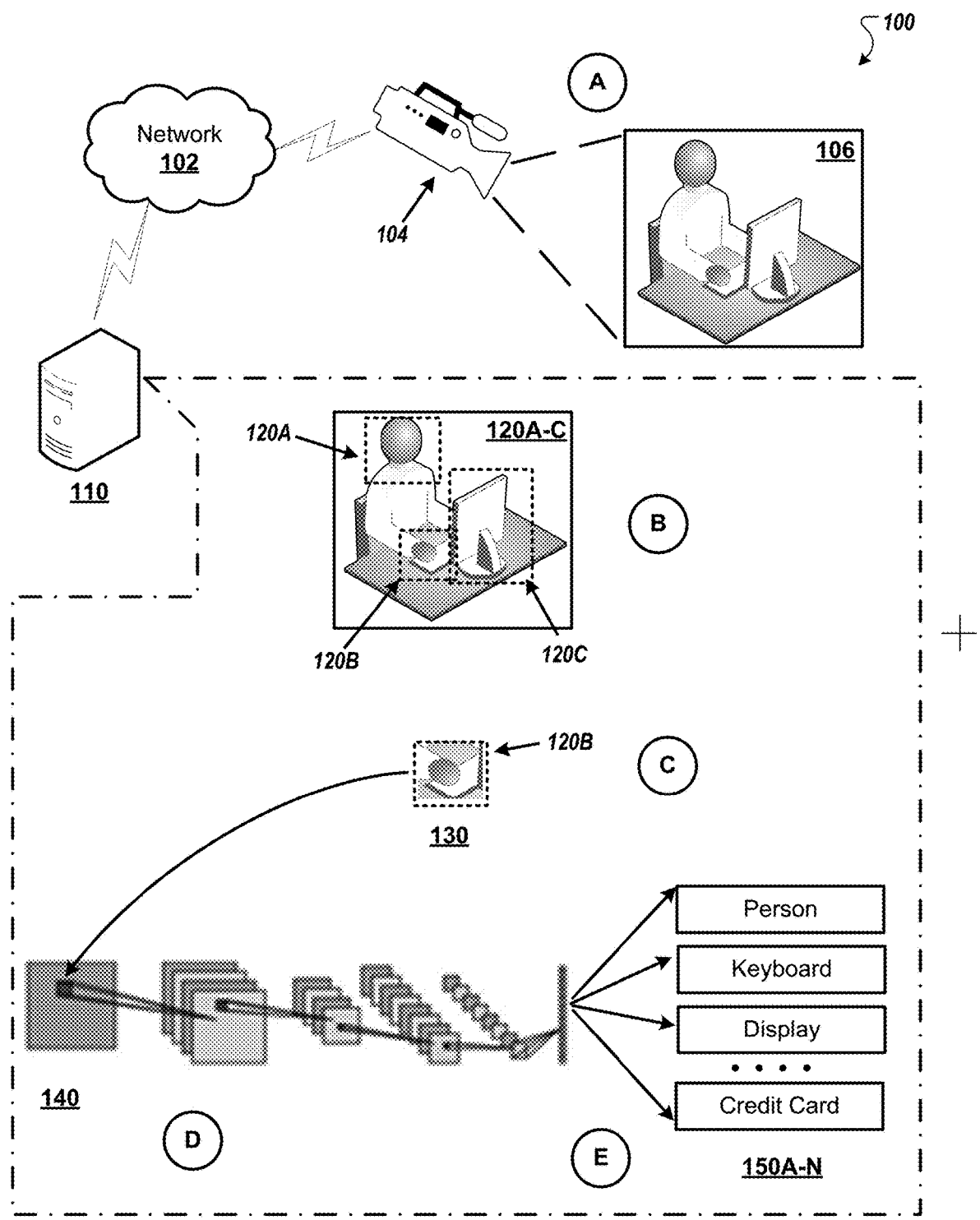
FIG. 1 is a diagram of an example system for preserving privacy in surveillance.

FIG. 1 is a diagram of an example system 100 for preserving privacy in surveillance. System 100 includes a camera 104 and a server 110 in communication over a network 102. The network 102 can include any network that is known such as a local area network (LAN), a wide area network (WAN), the Internet, or any combination thereof. The system 100 may include many different cameras, such as camera 104, and servers, such as server 110, connected over the network 102.

The camera 104 can include a video camera, a digital camera, or any other optical instrument for recording and capturing images. The camera 104 may be mounted at a fixed position and directed towards a scene, such as scene 106. The camera 104 may be directed towards the scene 106 for surveillance, image capture, security purposes, and the like. For example, at event (A), the camera 104 is directed towards the scene 106 to capture image/video data of the scene 106. The camera 104 can be configured to record and/or transmit captured image data to the server 110 over the network 102. The camera 104 may transmit still images, sequences of images, videos, and other forms of data to the server 110 so that the server 110 may analyze the images for processing.

The scene 106 includes entities such as a user and various objects. In scene 106, the user is interacting with a keyboard of a desktop computer. In this instance, the camera 104 may be directed towards the scene 106 to capture images of the scene 106. The captured images may be transmitted to the server 110 for surveillance purposes pertaining to the user, the keyboard, the desktop computer, or any combination thereof. In some aspects, the user, keyboard, and/or computer may be visible in a scene that is under surveillance, but are not a primary focus of the surveillance. For example, a camera may be directed towards a gate of an airport. In this instance, the camera may capture an image including a person that is using a computer in front of a door to the tarmac of the airport.

The server 110 can be configured to monitor the scene 106 using image data captured by the camera 104. The server 110 may collect images of the scene 106 and identify privacy regions within the scene 106. The privacy regions may correspond to particular objects, particular users, particular human-object-interactions, particular human-actions, particular geographical locations, and the like. The server 110 can be configured to identify privacy regions by comparing the captured image data to predefined privacy entities. For example, the server 110 can be trained using a database of images. Each of the images in the database may include predefined privacy regions that identify privacy entities, such as users or objects, that are included in the images. The server 110 may be trained on a collection of images from private databases of privately collected images, public databases such as IMAGENET, MS-COCO, PASCAL, or any combination thereof.

The server 110 can be configured to assimilate images that capture instances of privacy regions. The server 110 may assimilate the images to build detectors that may be used to identify privacy regions in newly captured images, or images that have not been previously identified to include privacy regions. For example, the server 110 may be configured to build the object detectors using convolutional neural networks (CNNs) that are integrated with region proposal networks to predict object boundaries and scores for predefined objects within captured images. In this instance, the server 110 may build object detectors that reduce the search space of object detection and classification. Additionally, or alternatively, the server 110 can be configured to build detectors that are used to classify users, objects, human-object-interactions (HOIs), and so on.

At event (B), the server 110 is configured to use the detectors to identify privacy regions 120A-C within the scene 106. The server 110 may receive one or more images captured by the camera 104 and use the captured images to identify the privacy regions 120A-C. The captured images may be received over a period of an hour, one day, a week, a month, and the like. The server 110 can be configured to monitor surveillance video of the camera 104, or specifically, process the captured still frames of the camera 104. The server 110 can be configured to identify privacy regions 120A-C in the captured images that indicate likely locations of human-object-interactions (HOIs) as well as human-to-human interactions (HHIs) within the captured image.

In other words, the server 110 can be configured to identify privacy regions 120A-C in the images based on identifying common locations for human interactions with objects in the scene, or with other humans. As such, the server can identify the privacy regions 120A-C as "hot-spots" for potential HOIs and/or potential HHIs. In this instance, the server 110 can identify multiple privacy regions including a face 120A of the user, the user's hands interacting with the keyboard 120B, and the display 120C of the desktop computing. As such, the server 110 can identify potential privacy regions that may include sensitive data using the trained detectors.

The server 110 can be configured to determine whether or not the privacy regions 120A-C include sensitive data. For example, the server 110 can be configured to analyze the identified privacy regions 120A-C and determine whether or not to obfuscate the privacy regions 120A-C. At event (C), the server 110 determines that the privacy region of the user's hands interacting with the keyboard 120B includes sensitive data 130. The server 110 may process the privacy region including sensitive data 130 to compute features of the privacy region. The server 110 may compute features of the privacy region with sensitive data 130 using detectors of the trained neural network 140, such as a pre-trained region proposal convolutional neural network (R-CNN-ST).

At event (D), the server 110 processes the privacy region that includes sensitive data 130 to classify the privacy region 130. For example, the server 110 can use the R-CNN-ST to classify the privacy region 130 as an object, a user, a HOI, or any other entity requiring privacy. Further, the server 110 can be configured to classify the privacy region 130 as a particular type of entity. In some aspects, the server 110 may classify the privacy region 130 as a particular type of entity. The server 110 may use the particular type of entity to determine which type of image obfuscation should be applied to the captured image, or specifically, to the privacy region identified to include the sensitive data 130.

At event (E), the server 110 analyzes each privacy region to determine a type of entity 150A-N included in the regions (i.e., a person, a keyboard, a display, a credit card, etc.). The server 110 may analyze the privacy region using visual object recognition. For example, the server may 110 may analyze the values of pixels of an image within the privacy region to identify objects in the image within the privacy region. The type of entity may be determined so that each privacy region is obfuscated on a case-by-case basis. In some aspects, scrambling may be an effective form of privacy region obfuscation when the server identifies the privacy region to include a first type of entity, such as a keypad, keyboard, credit card reader, cash register, access control panel, automated teller machine (ATM), computer monitor, tablet display, phone display, and the like. In this instance, the privacy region may include privacy implications when a user is interacting with an object in the scene. For example, a user may be typing a password on a computer. As such, the user's hands typing on the keyboard, as well as the display of the computer, may both be identified as privacy regions that include sensitive data. In other aspects, blur-kernels may be an effective form of privacy region obfuscation when the server identifies the privacy region to include a second type of entity, such as a credit card, driver's license, photo identification, passport, letters, bank statements, tax documents, and the like. In this instance, the privacy region may include privacy implications whenever the second type of entity is in view of the camera, and therefore should be obfuscated at all times to maintain privacy, even when a user is not currently present in a view. For example, a user may be looking at a security checkpoint in an airport. As such, the user's passport may be determined as a privacy region that includes sensitive data.

In some implementations, the server 110 may allow portions of images that are obfuscated to be shown without obfuscation. For example, the server 110 may show all portions of images without obfuscation if a security event, e.g., an intruder detection, is detected near the time the images are captured or if a person viewing the images has privileges to view images that are not obfuscated, e.g., is the property owner. The images may be encrypted at a macro-block level in such a way that obfuscated video may be playable without an appropriate decryption key and obfuscated portions may be available without obfuscation with the appropriate decryption key.

In some implementations, the server 110 may use other from other sources other than the images to determine whether an object is being interacted with by a person. For example, the server 110 may recognize a keypad in the images and receive data from the keypad that indicates that the keypad is currently being used, e.g., data representing keys being pressed, and based on determining that the keypad is being used, determine there is a HOI for the keypad and that the keypad should be obfuscated in the images while the event data from the keypad indicates that it is being used.

In some implementations, the server 110 may use input to identify objects. For example, the server 110 may receive a user selection of a region in an image and receive user input that specifies that the region corresponds to a keypad that should be obfuscated when there is a HOI with the keypad. Accordingly, the server 110 may then determine when there is a HOI with that region from the images and then obfuscate that region while the HOI is occurring.

Figure 2:
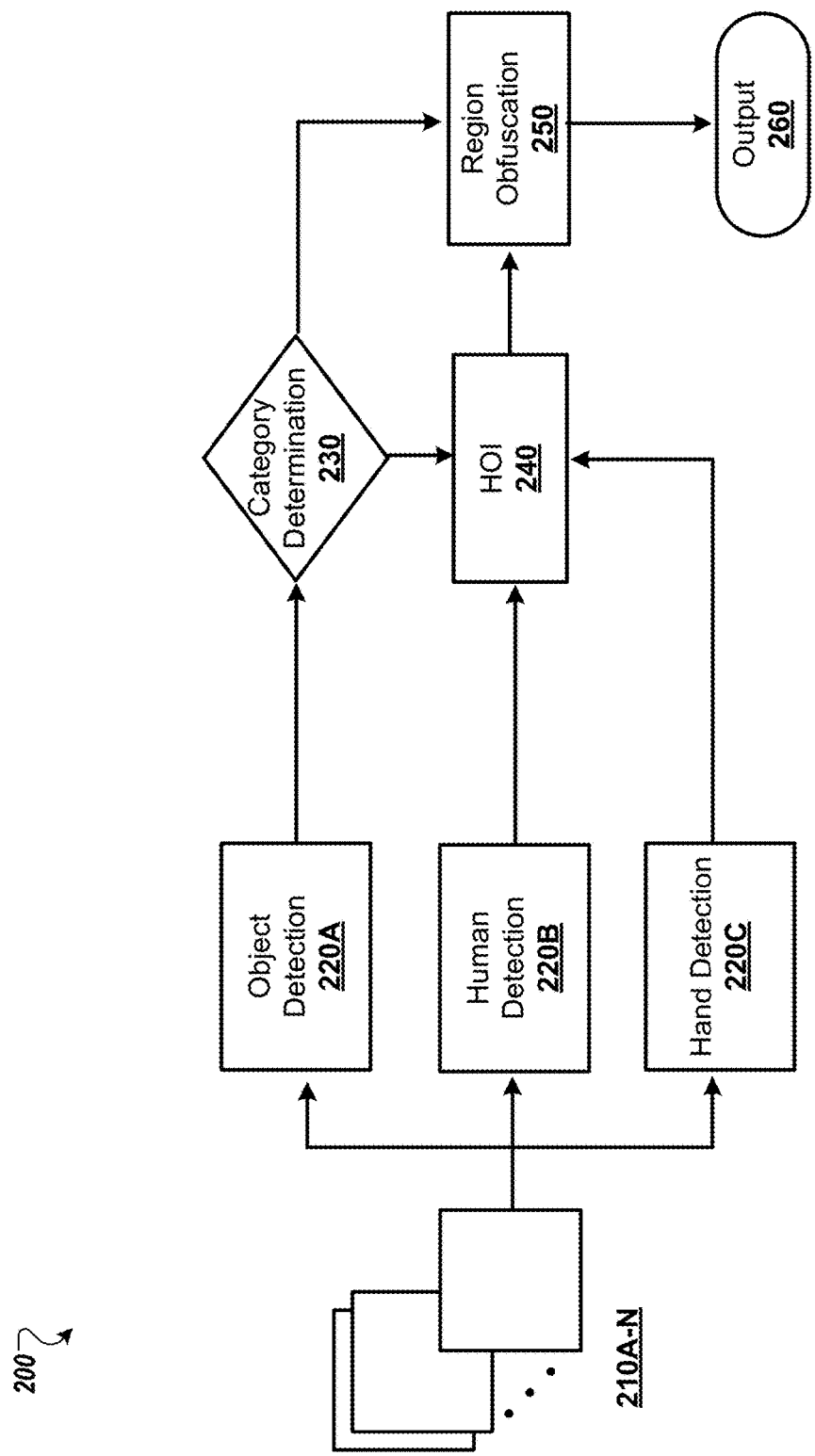
FIG. 2 is a diagram of an example workflow for preserving privacy in surveillance.

FIG. 2 is a diagram of an example workflow 200 for preserving privacy in surveillance. The workflow 200 illustrates an example pipeline of protecting privacy information across different types of entities. Specifically, the workflow 200 describes a process of receiving captured images as input and processing the captured images to identify regions that are suitable for obfuscation.

One or more captured images 210A-N may be provided to a server. The server may use a neural network model, such as a R-CNN-ST, to process the captured images 210A-N sequentially, in parallel, or any combination thereof. The server can process the captured images 210A-N by performing various types of detection on each image. For example, the server can be configured to perform object detection 220A on each image to identify privacy regions within the images. The privacy regions can be identified based on the detection of one or more predefined objects, such as a keyboard, desktop monitor, etc. In another example, the server can be configured to perform human detection 220B on each image to identify privacy regions within the images. The privacy regions can be identified based on the detection of one or more human features, such as a face of a user. In another example, the server can be configured to perform hand detection 220C on each image to identify privacy regions within the images. The privacy regions can be identified based on the detection of one or more hands of users. The object detection 220A, human detection 220B, and hand detection 220C may all be based on object detection where in the human detection 220B the object being detected for is a human and for the hand detection 220C the object being detected for is a hand.

The server may use the neural network model to detect the various entities in the images 210A-N. In some aspects, the server may use a first R-CNN-ST to perform object detection 220A, a second R-CNN-ST to perform human detection 220B, and a third R-CNN-ST to perform hand detection 230C. In other aspects, the server may use a single R-CNN-ST to perform all types of detection on each of the captured images 210A-C.

If the server performs object detection 220A on an image, the server can further be configured to determine a category of the object 230. In this instance, the server may compare the detected object to a database of predefined objects. If a match is found, the server can identify the object as a particular object. Further, the server may be configured to classify the object according to a particular category. The server may include a database of predefined categories that each define different types of objects. Additionally, or alternatively, the server can be configured to generate categories during training of the neural network model(s) and associate the generated categories with the identified objects, upon detection. The categories may be used by the server to determine a type of obfuscation 250 suitable for each identified privacy region. For example, the server can determine that a detected object is a keyboard associated with a certain category. In this instance, the server may determine that the privacy region including the keyboard should be obfuscated by pixel-scrambling when a user interacts with the keyboard. In this instance, pixel-scrambling may be determined to be the primary method of obfuscation due to the effectiveness of pixel-scrambling in obfuscating high-level motion patterns involved with objects.

After the server performs human detection 220B on an image, hand detection 220C on the image, or is unable to determine a particular category of an object in the image, the server can be configured to process HOIs 240 within the image. In this instance, the server can be configured to piece together entities detected within the image to identify interactions between the various images. For example, if a user is typing at a keyboard of a desktop computer, may initially identify privacy regions that include a monitor of the desktop computer, a face of the user, the keyboard, and hands of the user. However, by processing the HOIs 240, the server may determine when the user is interacting with the keyboard. In this instance, the server may determine particular images within the sequence of captured images 210A-N that need to be obfuscated, rather than obfuscating the entire set of images entirely.

In some implementations, the server may identify a privacy region within an image based on human detection without processing HOIs. For example, the server may determine that a detected human is undressed or partially undressed based on identifying bare skin around a torso or hip area of the detected human and, in response, identify the portions of the image with the undressed or partially undressed human as a privacy region, e.g., identify an outline of the entire human as a privacy region.

In some implementations, the server may identify a privacy region within an image based on identifying a detected human. For example, the server may identify that a detected human is a family member that lives in the house through determining that a face of the detected human in the image matches a pre-stored image of the face of the family member and, in response, identify the portions of the image showing the family member as a privacy region. Accordingly, the server may show images of strangers within a home without obscuring any portion of the strangers and obscure portions of images showing family members.

In some implementations, the server may be configured to identify a privacy region based on determining geographical locations shown in an image. For example, the server may identify portions of an image that show an inside of a bathroom, taken by a camera outside the bathroom, as a privacy region. For example, a user may draw a line on a threshold of a door or click a doorway in an image of the bathroom through a privacy region designation user interface. The server may automatically recognize the doorway as a planar feature of the image through video analytics.

The server may then identify regions of the image that show portions of the bathroom as privacy regions 250 so that objects or persons inside the room may be redacted or obscured in some form while the rest of the scene may appear normal. For example, the server may determine where feet of a detected human are positioned and if at least one foot is inside the bathroom, designate all portions of the image that show the detected human as a privacy region.

Accordingly, the privacy region 250 may be constructed by the server based geographic locations shown in the image instead of an image mask, e.g., an image mask drawn by a user to cover particular coordinates within an image. For example, a human passing by a bathroom door may not be obscured even though portions of the human in the image appear in the same pixel coordinates as some pixels that showed the inside of the bathroom before the human passed by the bathroom door.

The server can perform obfuscation of the identified privacy regions 250. The server may obfuscate 250 all privacy regions that include detected objects, humans or users, hands of users, HOIs, and so on. In some examples, the server analyzes each privacy region to determine if the privacy region includes sensitive data. For example, the server may detect a keyboard and computer monitor in a captured image. However, the server may determine that there are no HOIs in the captured image and therefore determine that the identified privacy regions do not include sensitive data.

The server can be configured to obfuscate the privacy regions and provide the privacy regions as output 260. In some aspects, the server is configured to provide the captured images with the obfuscated privacy regions contained in the image as output 260. Further, if the privacy regions are identified to not include sensitive data, the server may provide the captured image as output 260 without obfuscating any features of the image. The server may provide any combination of images, obfuscated regions, non-obfuscated regions, and processed images as output 260.

Figure 3:
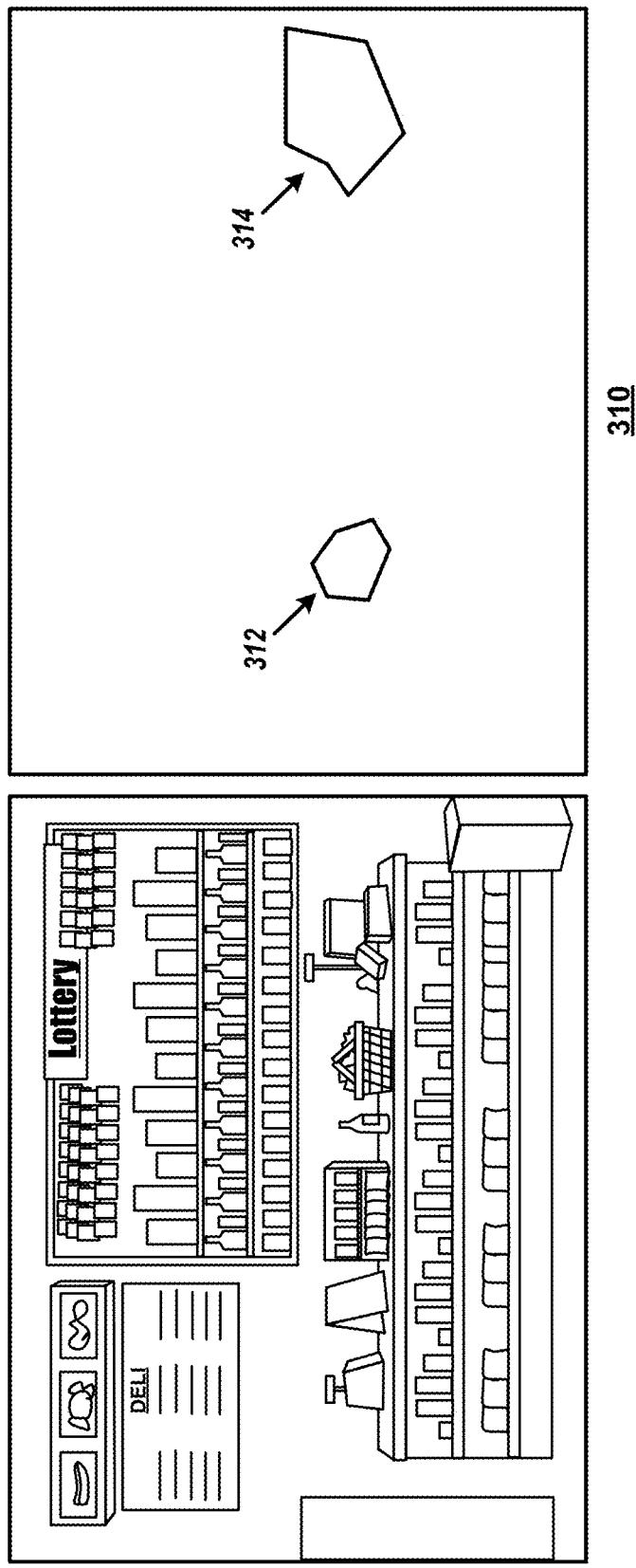
FIG. 3 is a diagram of example privacy regions.

FIG. 3 is a diagram of example privacy regions. The diagram of FIG. 3 includes a captured image 300 and a processed image 310. The processed image includes privacy regions 312 and 314 within the captured image 300 that are identified by a server. The captured image 300 corresponds to an image captured by a camera. In this instance, the camera is directed towards a check-out counter. The captured image 300 of the check-out counter includes various objects. The server may receive the captured image 300 from the camera. The captured image 300 may be processed by the server to identify privacy regions associated with captured images of the scene.

In some aspects, the server may use a series of captured images of the scene to identify privacy regions where sensitive data may be identified. For example, the camera can be directed towards the check-out counter so that images may be processed by the server. The server may process the images to detect objects and actions within the images. The server may process a series of images that are captured over the period of an hour, a day, a week, a month, and the like.

In some aspects, the server may detect objects or users within the scene. The server may also detect actions such as (i) a person reaching out to an object, (ii) two individuals exchanging an object, (iii) a person providing input by typing information, (iv) person performing a 'swipe' operation. The users and objects may be captured in the images and monitored for changes in state or location. The actions may be captured in the images and determined to occur repeatedly at the same locations within the multiple, captured images. In some aspects, the privacy regions 312 and 314 are identified using heat map identification. The heat map identification may indicate where sensitive data is likely to appear in the captured images. For example, server may process the captured images by deploying a viewpoint invariant human action detector. The human action detector can be used to generate a heat-map of locations where users/humans typically interact with the objects in the scene or with one-another. Subsequently, the objects that are located at those locations can be analyzed for privacy implications.

Referring to FIG. 3, the captured images of the scene may be processed to identify privacy regions where HOI typically occur, such as at privacy regions 312 and 314. In this instance, privacy region 312 may correspond to a region in a series of captured images where two individuals exchange money associated with transactions at the check-out counter. On the other hand, privacy region 314 may correspond to a region in a series of captured images where a user is typing at a keyboard of a cash register. The privacy regions 312 and 314 may be monitored for sensitive data. In this instance, the privacy regions 312 and 314 may be obfuscated to maintain privacy of the sensitive data.

Figure 4:
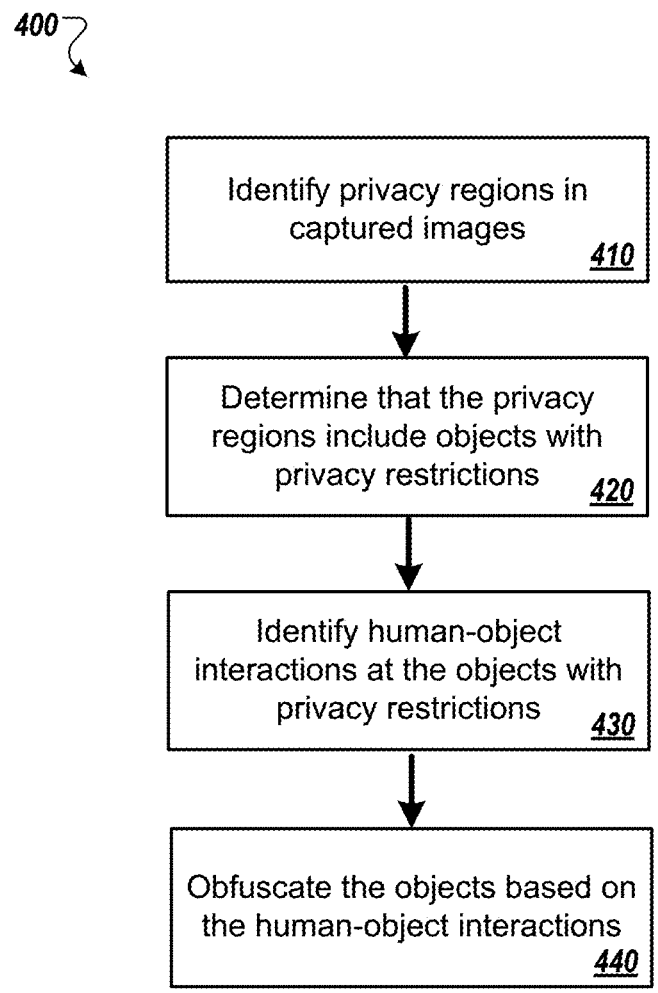
FIG. 4 is a flow chart illustrating an example process for preserving privacy using human-object interactions.

FIG. 4 is a flow chart illustrating an example process 400 for preserving privacy using human-object interactions. The process 400 can be performed by a server or other computing devices. For example, operations of the process 400 can be performed by server 110 of FIG. 1.

At step 410, the server identifies privacy regions in captured images. The server may receive images captured by a camera in communication with the server. The captured images may be received over a period of one day, a week, a month, and the like. The server can be configured to identify privacy regions in the captured images that indicate human-object-interactions (HOIs) as well as human-to-human interactions (HHIs) within the captured images. For example, the server may receive captured images from a camera directed towards a cash register at a grocery store. In this instance, the server can be configured to monitor surveillance video of the camera, or specifically, process the captured still frames of the camera. The server can be configured to identify privacy regions in the images based on identifying common locations for human interactions with objects in the scene, or with other humans. As such, the server can identify one or more privacy regions that indicate "hot-spots" for potential HOIs and/or potential HHIs.

At step 420, the server determines that the privacy regions include objects with privacy restrictions. The server may determine that the privacy regions include objects with privacy restrictions by processing the privacy regions for sensitive data. In some aspects, the server scans the identified privacy regions for a presence of objects with privacy implications. For example, the server may be configured to analyze the identified privacy regions against a list of predefined objects, to identify whether or not the privacy regions require privacy screening.

At step 430, the server identifies human-object interactions at the objects with privacy restrictions. The server may identify the HOIs at the objects using a pre-trained neural network model, such as a HO-CNN-ST model. The server may identify the HOIs at the objects with privacy restrictions by monitoring the privacy regions for a presence of a user or human. For example, a captured image may include a keyboard attached to a cash register. The server may determine that a privacy region within the image includes the keyboard of the cash register. The server may be configured to monitor the keyboard for human interaction with the keyboard. As such, the server can determine whether or not a human is interacting with the keyboard, or in other words, the server can determine when a HOI occurs at the object determined to include privacy restrictions.

At step 440, the server obfuscates the objects based on the human-object interactions. The server can be configured to obfuscate the appearances of the objects with privacy restrictions based on the identification of HOIs at the objects. In this instance, the server may determine that the HOIs at the objects includes sensitive data within the captured image. As such, the server may obfuscate the objects entirely. In some aspects, the server may be configured to obfuscate the objects only for a duration of the identified HOIs. The server may be configured to obfuscate the objects for the duration of the identified HOIs such that portions of the image are able to be viewed in processed images without privacy restrictions, when the HOIs are not present.

Figure 5:
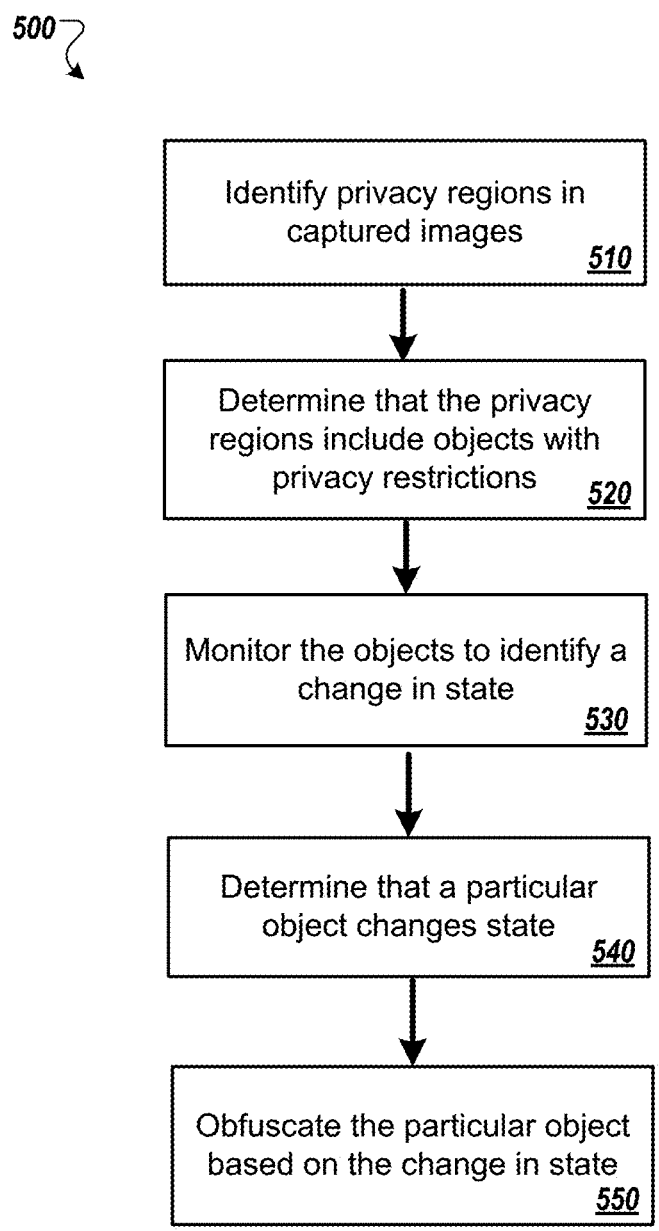
FIG. 5 is a flow chart illustrating an example process for preserving privacy by monitoring changes in state.

FIG. 5 is a flow chart illustrating an example process 500 for preserving privacy by monitoring changes in state. The process 500 can be performed by a server or other computing devices. For example, operations of the process 500 can be performed by server 110 of FIG. 1.

At step 510, the server identifies privacy regions in captured images. The server may receive images captured by a camera in communication with the server. The captured images may be received over a period of one day, a week, a month, and the like. The server can be configured to identify privacy regions in the captured images that indicate human-object-interactions (HOIs) as well as human-to-human interactions (HHIs) within the captured images. For example, the server may receive captured images from a camera directed towards a cash register at a grocery store. In this instance, the server can be configured to monitor surveillance video of the camera, or specifically, process the captured still frames of the camera. The server can be configured to identify privacy regions in the images based on identifying common locations for human interactions with objects in the scene, or with other humans. As such, the server can identify one or more privacy regions that indicate "hot-spots" for potential HOIs and/or potential HHIs.

At step 520, the server determines that the privacy regions include objects with privacy restrictions. The server may determine that the privacy regions include objects with privacy restrictions by processing the privacy regions for sensitive data. In some aspects, the server scans the detected privacy regions for a presence of objects with privacy implications. For example, the server may be configured to analyze the identified privacy regions against a list of predefined objects, to identify whether or not the privacy regions require privacy screening.

At step 530, the server monitors the objects to identify a change in state. The server can be configured to monitor objects in the privacy regions such as non-moveable objects like a personal computer, an ATM, a keypad, and so on. The server can be configured to monitor the objects in the privacy regions continuously, for extended periods of time. For example, the server may monitor a stream captured images of an ATM. The stream of images may be captured by a camera directed towards the ATM for a span of an hour, a day, a week, or any other span of time.

At step 540, the server determines that a particular object changes state. The server can be configured to continuously monitor the objects in the privacy regions. The objects may be continuously monitored using a classifier that detects whether or not a state change occurs. In some aspects, the classifier can include a robust binary classifier, such as a convolutional neural network based classifier. The server can be configured to identify when a particular object changes state in a captured image. The server may implement privacy protection of the particular object in response to the detected state change. For example, the server may be configured to determine when an ATM monitor turns on/off, when a keypad of the ATM changes color, and the like.

At step 550, the server obfuscates the particular object based on the change in state. The server can be configured to determine that the state change of the particular object indicates sensitive data within the captured image. As such, the server can be configured to obfuscate the object when the object undergoes a state change, in response to determining that the privacy of sensitive data should be protected. For example, the server may determine that the ATM keypad lights up and therefore obfuscate the monitor and/or the keypad of the ATM for the duration of the state change.

Figure 6:
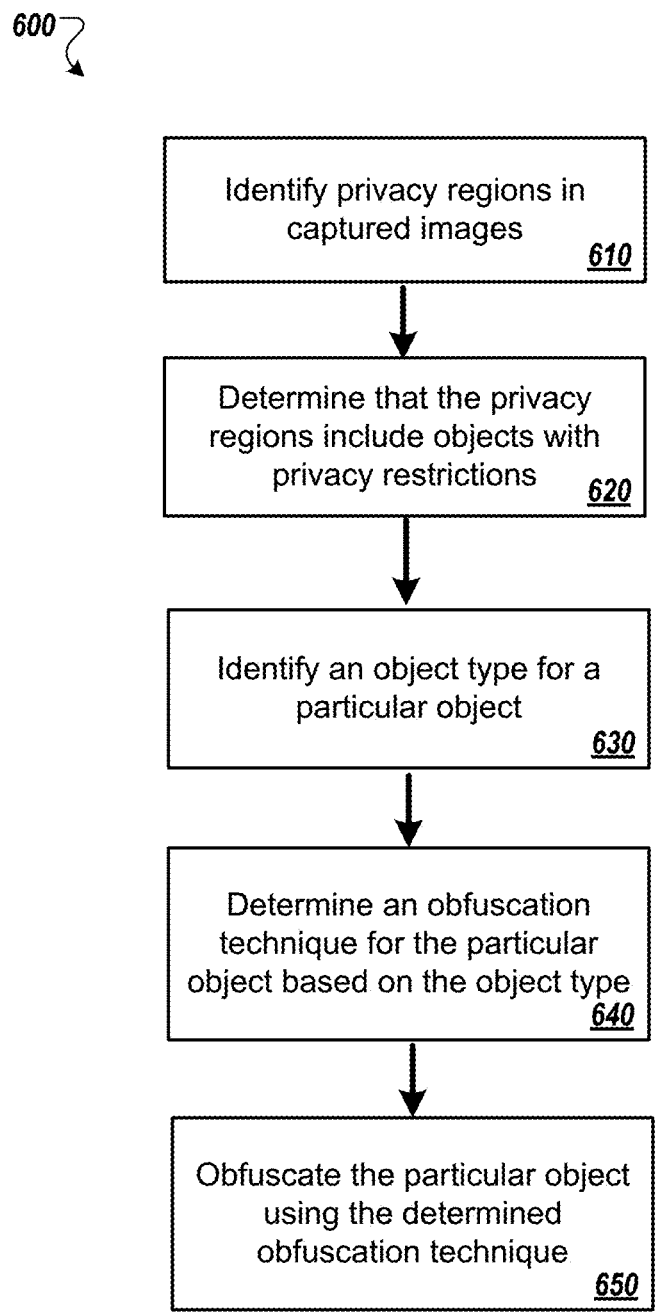
FIG. 6 is a flow chart illustrating an example process for preserving privacy using object types.

FIG. 6 is a flow chart illustrating an example process 600 for preserving privacy using object types. The process 600 can be performed by a server or other computing devices. For example, operations of the process 600 can be performed by server 110 of FIG. 1.

At step 610, the server identifies privacy regions in captured images. The server may receive images captured by a camera in communication with the server. The captured images may be received over a period of one day, a week, a month, and the like. The server can be configured to identify privacy regions in the captured images that indicate human-object-interactions (HOIs) as well as human-to-human interactions (HHIs) within the captured images. For example, the server may receive captured images from a camera directed towards a cash register at a grocery store. In this instance, the server can be configured to monitor surveillance video of the camera, or specifically, process the captured still frames of the camera. The server can be configured to identify privacy regions in the images based on identifying common locations for human interactions with objects in the scene, or with other humans. As such, the server can identify one or more privacy regions that indicate "hot-spots" for potential HOIs and/or potential HHIs.

At step 620, the server determines that the privacy regions include objects with privacy restrictions. The server may determine that the privacy regions include objects with privacy restrictions by processing the privacy regions for sensitive data. In some aspects, the server scans the identified privacy regions for the presence of objects with privacy implications. For example, the server may be configured to analyze the identified privacy regions against a list of predefined objects, to identify whether or not the privacy regions require privacy screening.

At step 630, the server identifies an object type for a particular object. The server can be configured to analyze a privacy region to determine an object type for the particular object included in the privacy region. The type of object may be determined so that each privacy region is obfuscated on a case-by-case basis according to the type of object. For example, the server may be configured to classify objects according to a first type and a second type. In this instance, the first type of objects can include a keypad, keyboard, credit card reader, cash register, access control panel, automated teller machine (ATM), computer monitor, tablet display, phone display, and the like. In this instance, the privacy region may include privacy implications when a user is interacting with an object in the scene. The second type of objects can include a credit card, driver's license, photo identification, passport, and the like. In this instance, the privacy region may include privacy implications whenever the second type of entity is in view of the camera's focus, and therefore should be obfuscated at all times.

At step 640, the server determines an obfuscation technique for the particular object based on the object type. The server may apply one or more different obfuscation techniques to the particular object based on the object type. For example, a user may be typing a password on a computer keyboard. As such, the keyboard may be determined to be the particular object that is associated with the first object type. In this instance, the keyboard may be obfuscated by scrambling the privacy region in the image that includes the keyboard. Specifically, the keyboard may be obfuscated when a user is interacting with the keyboard. In another example, a user may be looking at a passport at a security checkpoint in an airport. As such, the passport may be determined as the particular object that is associated with the second object type. In this instance, the passport may be obfuscated by blur-kernels in all images containing the passport.

At step 650, the server obfuscates the particular object using the determined obfuscation technique. The server can be configured to automatically perform a particular obfuscation technique on the particular object based on the object type. The server can be configured to obfuscate the particular object entirely. In some aspects, the server is configured to obfuscate the particular object for a duration of an identified HOI. The server may be configured to obfuscate the particular object such that the privacy region containing the particular object can be viewed without privacy restrictions, when HOIs are not present.

Figure 7:
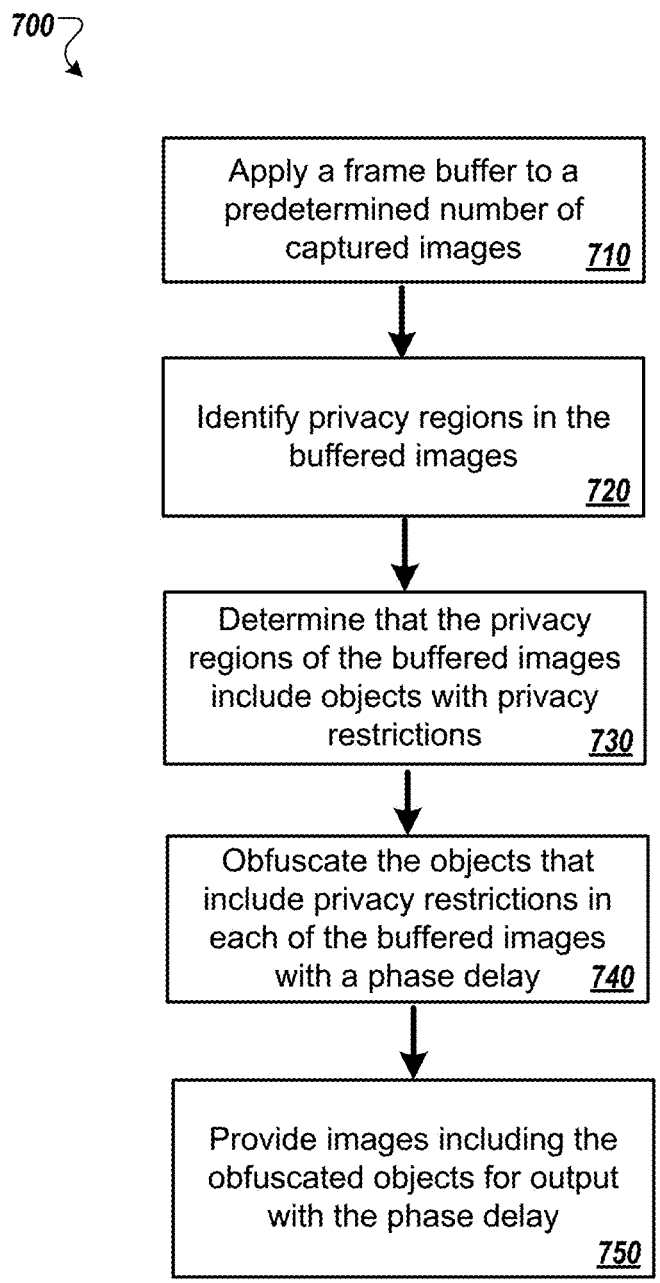
FIG. 7 is a flow chart illustrating an example process for preserving privacy using buffered images.

FIG. 7 is a flow chart illustrating an example process 700 for preserving privacy using buffered images. The process 700 can be performed by a server or other computing devices. For example, operations of the process 700 can be performed by server 110 of FIG. 1.

At step 710, the server applies a frame buffer to a predetermined number of captured images. The server can be configured to identify a frame buffer size and apply the frame buffer to a subset of captured images. The frame buffer may be used by the server in look-ahead applications, such as stored video, stored images, digital video recording. In this instance, the server can be configured to perform privacy analysis on spatial windows that include current and future video frames using the applied frame buffer.

At step 720, the server identifies privacy regions in the buffered images. The server may access buffered images captured by a camera in communication with the server. The server can be configured to identify privacy regions in the buffered images that indicate human-object-interactions (HOIs) as well as human-to-human interactions (HHIs) within the buffered images. For example, the server may receive buffered images from a camera directed towards a cash register at a grocery store. In this instance, the server can be configured to monitor surveillance video of the camera, or specifically, process the buffered still frames of the camera. The server can be configured to identify privacy regions in the buffered images based on identifying common locations for human interactions with objects in the scene, or with other humans. As such, the server can identify one or more privacy regions that indicate "hot-spots" for potential HOIs and/or potential HHIs.

At step 730, the server determines that the privacy regions of the buffered images include objects with privacy restrictions. The server can be configured to perform privacy analysis on the set of buffered images. In this instance, the server may determine that the privacy regions include objects with privacy restrictions by processing the privacy regions for sensitive data. In some aspects, the server scans the detected privacy regions for the presence of objects with privacy implications. For example, the server may be configured to analyze the determined privacy regions against a list of predefined objects to identify whether or not the privacy regions require privacy screening. In some aspects, the server determines that the privacy regions include objects with privacy restrictions if certain conditions are satisfied. For example, the server can be configured to analyze the set of buffered frames and determine that the privacy regions include objects with privacy restrictions if the objects are identified to include the privacy restrictions on 50% or more of the buffered frames in the set.

At step 740, the server obfuscates the objects that include privacy restrictions in each of the buffered images with a phase delay. The server can be configured to obfuscate appearances of the objects with the phase delay based on the identification of HOIs at the objects. In this instance, the server may determine that the HOIs at the objects include sensitive data within the buffered images. As such, the server may obfuscate the objects entirely. Otherwise, the server may be configured to obfuscate the objects for a select number of the buffered frames in which the identified HOIs are captured. For example, the server may obfuscate the objects for the duration of the identified HOIs such that the objects can be viewed without privacy restrictions during the buffered frames in which the HOIs are not present.

At step 750, the server provides images including the obfuscated objects for output with the phase delay. The server can be configured to provide the buffered images with the obfuscated privacy regions contained in the image as output. Further, if a subset of the buffered images includes privacy regions that are identified to not include sensitive data, the server may provide the subset of buffered images as output without obfuscating any features of the subset. In some aspects, the buffered frames may be processed and stored with the phase delay. For example, the buffered frames may be processed and stored on a disk for later viewing. The disk may be used to display the buffered frames at a later point in time with the sensitive data masked by the obfuscation techniques.

Figure 8:
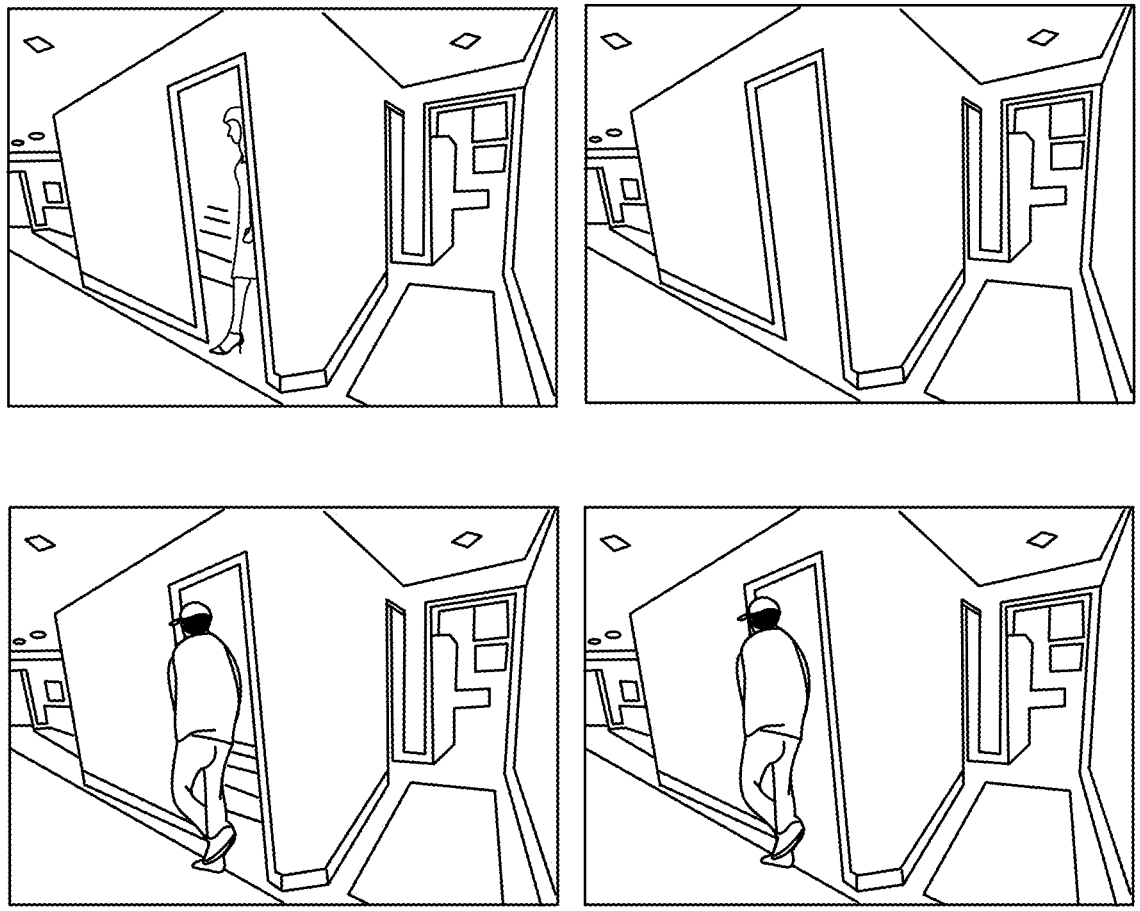
FIG. 8 is a diagram of example of preserving privacy in surveillance.

FIG. 8 is an example diagram of preserving privacy in surveillance. The upper left image of FIG. 8 shows an image of a person inside a bathroom without redacting. The upper right image of FIG. 8 shows an image where the bathroom is designated as a private location so that an opening of the bathroom is redacted and the person is also redacted. The lower left image of FIG. 8 shows an image where a person is standing outside a bathroom without any redacting. The lower right image of FIG. 8 shows an image where a person is standing outside a bathroom and is not redacted at all even though portions of the person appear in pixels that would otherwise show the opening of the bathroom if the person were not standing in front of the bathroom and the portions of the bathroom that are not blocked by the person are redacted.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an example of the described systems, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments have been described. Other embodiments are within the scope of the disclosure. For example, the steps recited in the example processes can be performed in a different order and still achieve desirable results.

What is claimed is:

1. A computer-implemented method comprising:
   obtaining an image of a scene captured by a camera;
   identifying a person in the image through object recognition;
   determining locations of feet of the person;
   determining that neither locations of feet of the person are within a room;
   based on determining that neither locations of the feet are within the room, determining that the person is in front of the room but not inside the room; and
   in response to determining that the person is in front of the room but not inside the room, obfuscating, in the image, the room and not the person.

2. The method of claim 1, wherein determining that the person is in front of the room and not inside the room comprises:
   determining that the person is in front of a doorway to the room and outside the room.

3. The method of claim 2, wherein, as shown in the image, the person is passing in front of the doorway.

4. The method of claim 1, wherein obfuscating, in the image, the room and not the person comprises:
   obfuscating portions of a doorway to the room that are shown in the image and not obfuscating portions of the person that are shown blocking a view of other portions of the doorway.

5. The method of claim 1, wherein the room comprises a bathroom.

6. The method of claim 1, comprising:
   determining that a second person is at least partially inside the room as shown in a second image; and
   in response to determining that the second person is at least partially inside the room as shown in the second image, obfuscating an entirety of the second person inclusive of a portion of the second person that is shown in the second image as not inside the room.

7. A system comprising:
   one or more computers and one or more storage devices storing instructions that are operable, when executed by the one or more computers, to cause the one or more computers to perform operations comprising:
   obtaining an image of a scene captured by a camera;
   identifying a person in the image through object recognition;
   determining locations of feet of the person;
   determining that neither locations of feet of the person are within a room;
   based on determining that neither locations of the feet are within the room, determining that the person is in front of the room but not inside the room; and
   in response to determining that the person is in front of the room but not inside the room, obfuscating, in the image, the room and not the person.

8. The system of claim 7, wherein determining that the person is in front of the room and not inside the room comprises:
   determining that the person is in front of a doorway to the room and outside the room.

9. The system of claim 8, wherein, as shown in the image, the person is passing in front of the doorway.

10. The system of claim 7, wherein obfuscating, in the image, the room and not the person comprises:
    obfuscating portions of a doorway to the room that are shown in the image and not obfuscating portions of the person that are shown blocking a view of other portions of the doorway.

11. The system of claim 7, wherein the room comprises a bathroom.

12. The system of claim 7, the operations comprising:
determining that a second person is at least partially inside the room as shown in a second image; and
in response to determining that the second person is at least partially inside the room as shown in the second image, obfuscating an entirety of the second person inclusive of a portion of the second person that is shown in the second image as not inside the room.

13. A non-transitory computer-readable medium storing software comprising instructions executable by one or more computers which, upon such execution, cause the one or more computers to perform operations comprising:
obtaining an image of a scene captured by a camera;
identifying a person in the image through object recognition;
determining locations of feet of the person;
determining that neither locations of feet of the person are within a room;
based on determining that neither locations of the feet are within the room, determining that the person is in front of the room but not inside the room; and
in response to determining that the person is in front of the room but not inside the room, obfuscating, in the image, the room and not the person.

14. The medium of claim 13 wherein determining that the person is in front of the room and not inside the room comprises:
determining that the person is in front of a doorway to the room and outside the room.

15. The medium of claim 14, wherein, as shown in the image, the object is a person is passing in front of the doorway.

16. The medium of claim 13, wherein obfuscating, in the image, the room and not the person comprises:
obfuscating portions of a doorway to the room that are shown in the image and not obfuscating portions of the person that are shown blocking a view of other portions of the doorway.

17. The medium of claim 13, wherein the room comprises a bathroom.

* * * * *

UNITED STATES PATENT AND TRADEMARK OFFICE
CERTIFICATE OF CORRECTION

PATENT NO. : 11,032,491 B2  
APPLICATION NO. : 17/007486  
DATED : June 8, 2021  
INVENTOR(S) : David James Hutz et al.

Page 1 of 1

It is certified that error appears in the above-identified patent and that said Letters Patent is hereby corrected as shown below:

In the Claims

Claim 15, Column 18, Line 11, before "person" delete "object is a".

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*